United States Patent
Li (10) Patent No.: US 11,249,216 B2
(45) Date of Patent: Feb. 15, 2022

(54) SYSTEM AND METHODOLOGY OF CROSS CASING RESISTIVITY TOOL

(71) Applicant: Shanjun Li, Katy, TX (US)

(72) Inventor: Shanjun Li, Katy, TX (US)

(*) Notice: Subject to any disclaimer, the term of this patent is extended or adjusted under 35 U.S.C. 154(b) by 196 days.

(21) Appl. No.: 16/316,399

(22) PCT Filed: Sep. 10, 2017

(86) PCT No.: PCT/US2017/050871
§ 371 (c)(1),
(2) Date: Jan. 9, 2019

(87) PCT Pub. No.: WO2018/052820
PCT Pub. Date: Mar. 22, 2018

(65) Prior Publication Data
US 2020/0183043 A1  Jun. 11, 2020

(51) Int. Cl.
*G01V 3/24* (2006.01)
*G01V 3/38* (2006.01)

(52) U.S. Cl.
CPC . *G01V 3/24* (2013.01); *G01V 3/38* (2013.01)

(58) Field of Classification Search
CPC ... G01V 3/24; G01V 3/38; G01V 3/28; G01V 3/26; G01V 1/44; G01V 1/50; G01V 3/20
See application file for complete search history.

(56) References Cited

U.S. PATENT DOCUMENTS

| | | | | |
|---|---|---|---|---|
| 6,246,240 | B1* | 6/2001 | Vail, III | G01V 3/24 324/368 |
| 6,603,314 | B1* | 8/2003 | Kostelnicek | G01V 3/24 324/368 |
| 6,894,500 | B2* | 5/2005 | Benimeli | G01V 3/24 324/368 |
| 2006/0191683 | A1* | 8/2006 | Fukuhara | G01N 25/18 166/250.01 |
| 2008/0061789 | A1* | 3/2008 | Coates | E21B 47/13 324/333 |
| 2012/0061084 | A1* | 3/2012 | Sweatman | E21B 41/0064 166/305.1 |
| 2014/0368200 | A1* | 12/2014 | Wang | G01V 3/28 324/338 |
| 2017/0285217 | A1* | 10/2017 | Fang | G01V 3/28 |

* cited by examiner

*Primary Examiner* — Christopher P McAndrew
*Assistant Examiner* — Zannatul Ferdous
(74) *Attorney, Agent, or Firm* — Enshan Hong; MagStone Law, LLP (57) ABSTRACT

The present invention provides a methodology and system for determining formation resistivity beyond a casing. Using devices to generate, direct, and measure electric signals, the travel speed, travel time, attenuation and phase shift of an electric signal traveling through the casing can be measured. Applying a relationship between the travel speed or travel time of an electric signal and the formation resistivity beyond a casing, it is then possible to determine the formation resistivity beyond a casing by measuring the travel speed or travel time or phase shift or attenuation of an electric signal.

19 Claims, 8 Drawing Sheets

SYSTEM AND METHODOLOGY OF CROSS CASING RESISTIVITY TOOL

FIELD OF THE INVENTION

The present invention relates to the field of measuring formation resistivity from behind a casing, which can be referred to as Cased Hole Formation Resistivity or Resistivity Behind Casing. In one embodiment, there are provided designs of electromagnetic (EM) cross casing resistivity tools that can provide deep-reading measurements of formation resistivity from behind a casing.

BACKGROUND OF THE INVENTION

After years of production, the owner of an oil and gas reservoir, usually an oil company needs to re-evaluate the reservoir for information such as water saturation of the reservoir. The resistivity of the reservoir is a key parameter used to compute the saturation. In order to obtain the resistivity, some cross casing resistivity tools have been developed by oil service companies. The operation principal of the tools is to measure an electric field with three electrodes that are completely attached on the casing, and the measurement can be converted to reservoir resistivity beyond the casing. The current operation principal has shortcomings such as slow logging speed requiring complete touch between measuring electrodes and casing, and the problems in the casing itself. Hence, there is a need for improved methods and systems for cross casing resistivity logging tools.

SUMMARY OF THE INVENTION

In the present invention, a new methodology is presented, which measures the travel speed of electric signal, e.g., electric current or voltage, propagating on the casing, instead of the electric field along the casing. The speed relates directly to the formation resistivity behind the casing, and can be used to compute the formation resistivity more efficiently.

The present invention provides methods and systems for cross casing resistivity logging tools. In one embodiment, instead of measuring electric field along casing, which is how current cross casing resistivity logging tools operate, the present invention measures the current flowing speed in the casing which can then be easily converted to formation resistivity beyond the casing.

BRIEF DESCRIPTION OF THE DRAWINGS

One can obtain a better understanding of the present invention from the following detailed description of various embodiments. The attached drawings are only examples.

The drawings and following detail description are just examples to understand the present invention which is susceptible to various modifications and alternative forms. It should be understood, however, that the drawings and detailed description thereof are not intended to limit the scope of the appended claims.

DETAILED DESCRIPTION

As used herein, 'electric dipole" refers to a source with two parts and current can flow out from one part into a medium around the source and flow back to the other.

As used herein, "cross casing resistivity" refers to the measure of the formation resistivity across or through a casing.

As used herein, "electrode(s)" refers to one or a group of solid electric conductor through which an electric current enters or leaves an electrolytic cell or other medium. A group of solid electric conductor means that there are more than one electric conductor located at same position along tool body and has different azimuthal angle for each electric conductor.

As used herein, "antenna(s)" refers to a device through which an electric current enters or leaves an electrolytic cell or other medium.

As used herein, "source" or "source system" refers to an AC current source.

Figure 1A:
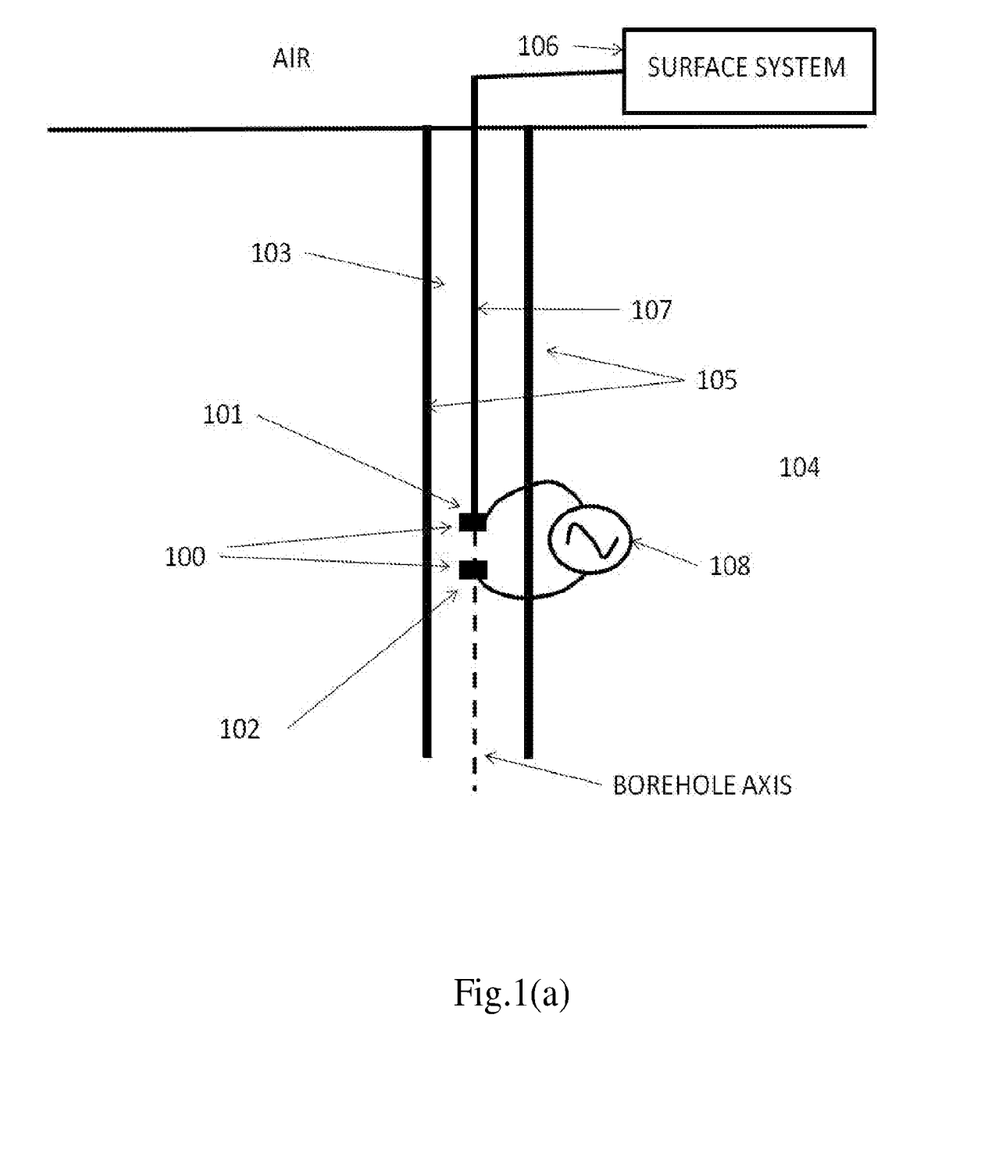
FIG. 1(a) shows one example of a new cross casing resistivity tool source, an electric dipole.

FIG. 1(a) shows an example of source system 100 used in a new cross casing resistivity tool. Electrode 101 is used to let a current to flow out and electrode 102 is used to let the current to flow back. So, the electrode 101 and electrode 102 can be regarded as an electric dipole. The electrodes 101, 102 are located inside of the borehole 103. The borehole 103 is separated from a formation 104 by a casing 105. The casing 105 is some material with high conductivity, such as steel. The electrodes 101 and 102 are connected to an earth surface system 106 by an electric cable 107. In one embodiment, the surface system 106 may include power system used to supply power to the down hole devices, control system used to control the whole system, and/or computers used to collect, store and process data and measurements. In one embodiment, the power system can be a power source 108 which is connected to the two electrodes 101 and 102 and supplies AC current or voltage between them.

Figure 1B:
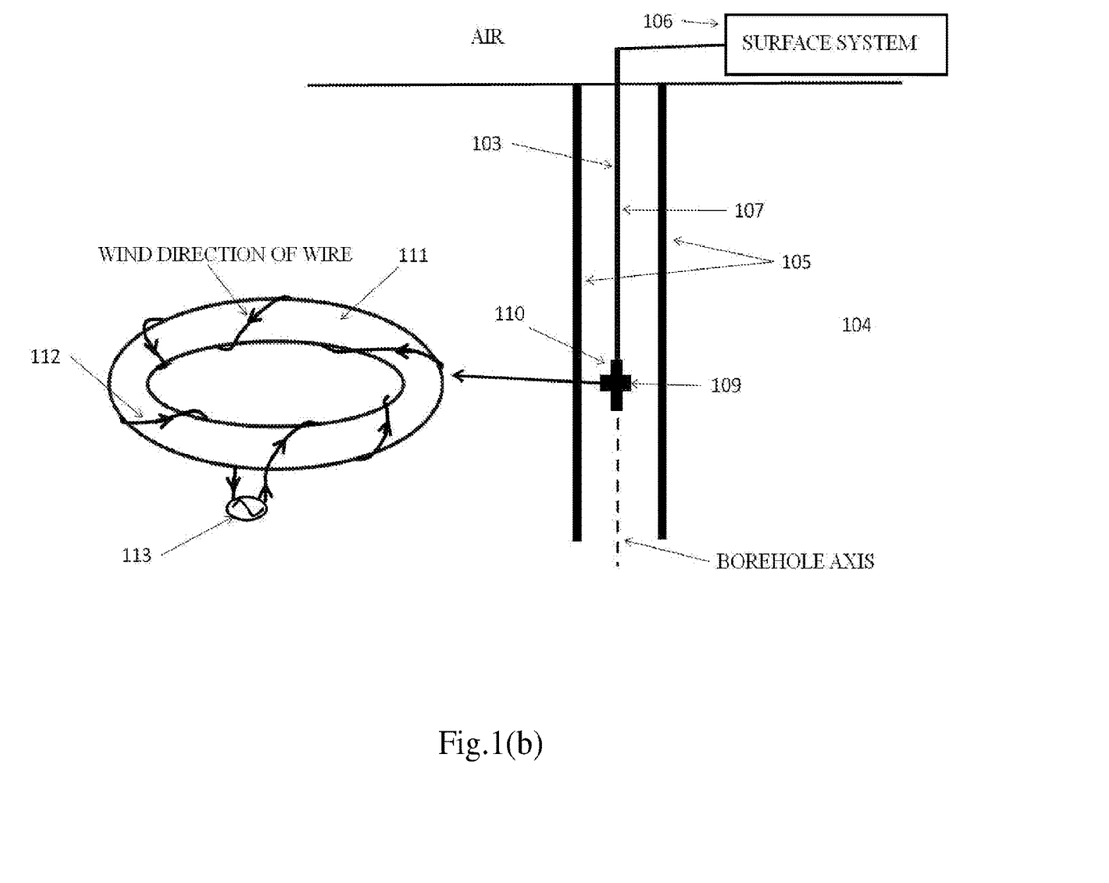
FIG. 1(b) shows another example of a new cross casing resistivity tool source, a toroid coil.

FIG. 1(b) shows another example of source system used in a new cross casing resistivity tool. A toroid coil 109, which can be regarded as an electric dipole, is mounted on a conductive metal bar 110 that is connected to an earth surface system 106 by an electric cable 107. In one embodiment, the toroid coil 109 comprises a closed ring 111 (e.g. a ferrite ring) and a conductive wire 112 wound around the ring 111. The ends of the conductive wires 112 are connected to an AC power source 113. In one embodiment, the power source 113 is supplied by surface system 106.

Figure 2:
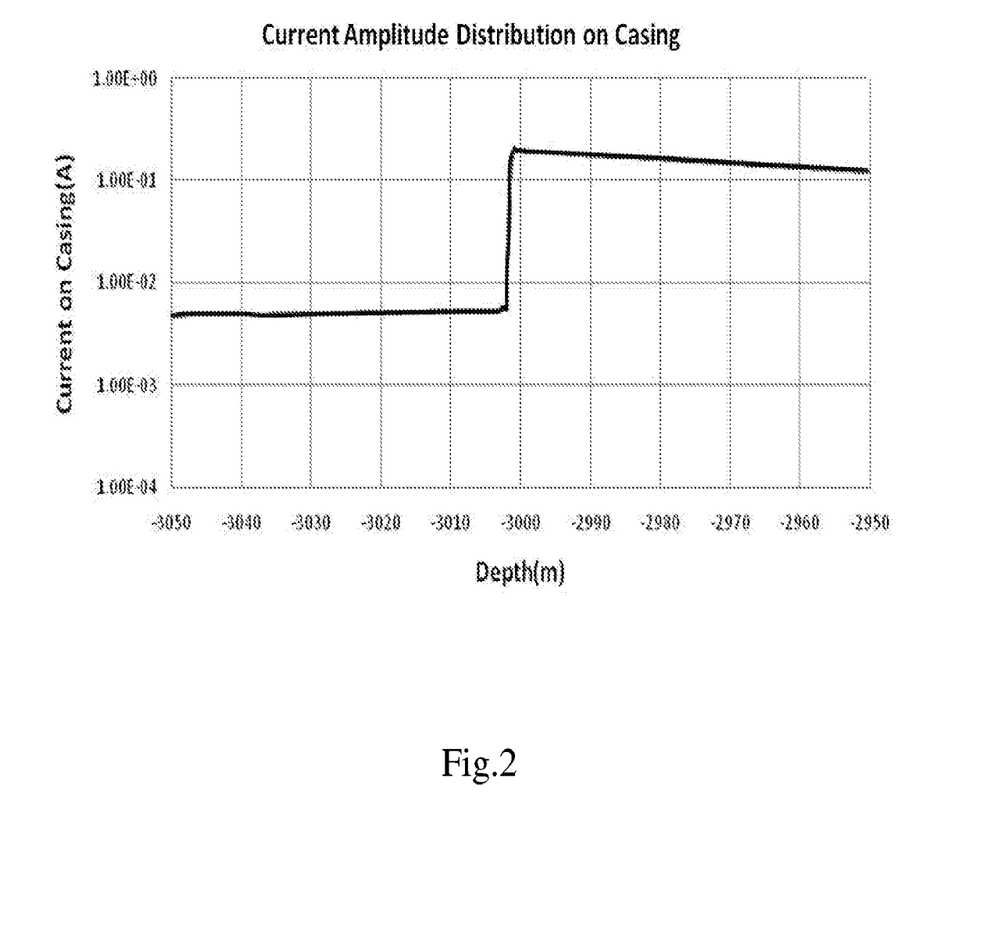
FIG. 2 illustrates a current distribution on the casing.

FIG. 2 shows a graph of current amplitude distribution on the casing 105 around the source 100 located at a depth 3000 meters. The spacing between electrode 101 and electrode 102 is 1 meter. The source 100 is supplied with an AC power. The graph shows a change in current along the casing around the source 100.

Figure 3:
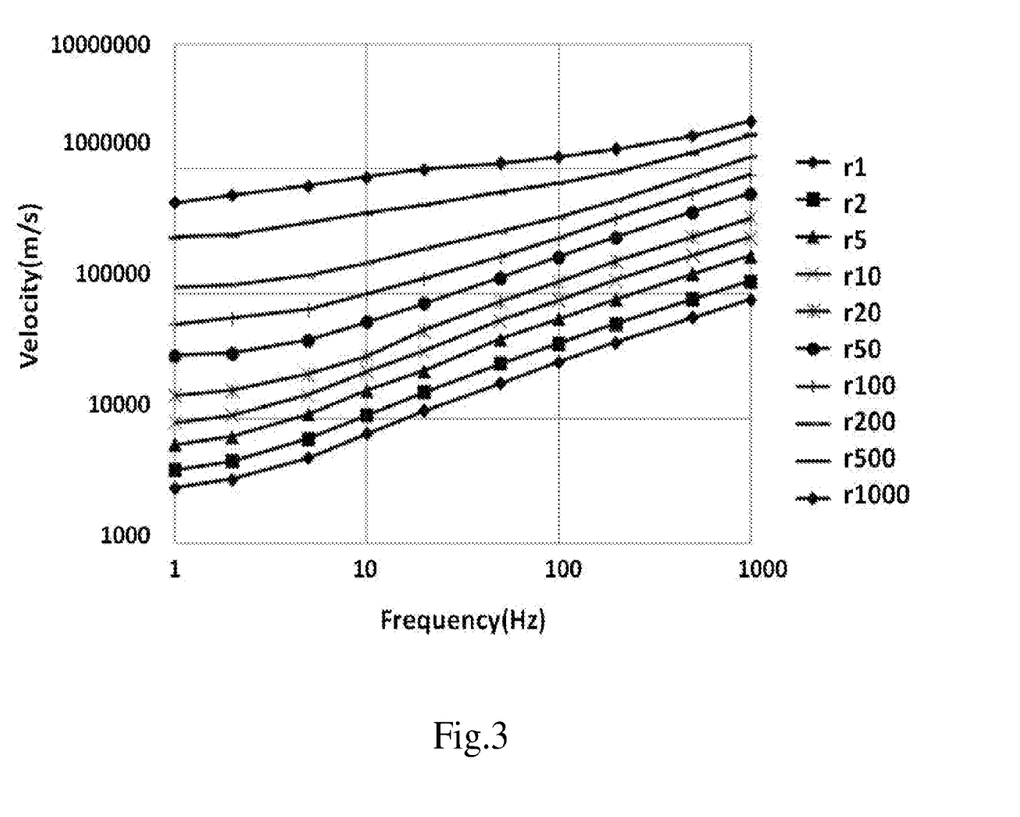
FIG. 3 illustrates the velocity of current flowing on the casing.

FIG. 3 is a graph showing current velocities flowing on the casing 105 with different frequencies and different formation resistivity. The velocity has a monotonous relationship with the formation resistivity when the frequency is fixed, indicating that the formation resistivity can be computed from the current velocity on the casing.

Figure 4:
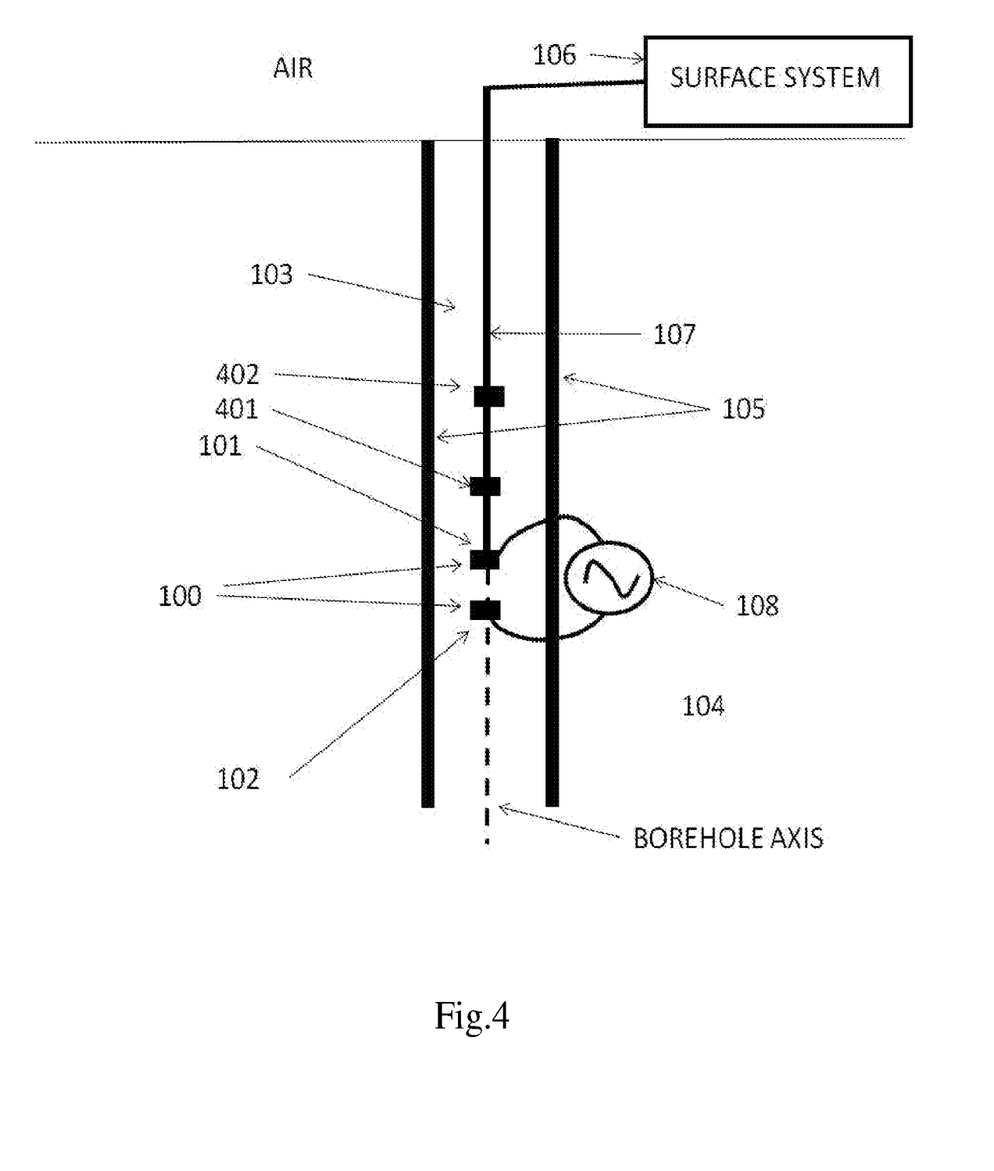
FIG. 4 shows one example of a new cross casing resistivity tool.

FIG. 4 shows one embodiment of a new cross casing resistivity tool, in which there are two receivers 401, 402 (e.g. measuring antennas) mounted above a source system 100 as shown in FIG. 1. The two receivers 401, 402 are used to measure current information, such as current phase, or amplitude, with time. From the measured current information, the differences of the current arrival times between the two receivers 401, 402 can be calculated. The time differences can be used to compute the velocity of the current flowing on the casing 105, and the velocity of the current can determine the resistivity of the formation 104 beyond the casing 105. In one embodiment, the source system may emit a time domain signal, such as an impulse. Time domain signals usually contain a broad range of frequencies. One or several frequencies (or small ranges of frequencies) have to be abstracted from the received signal to decide the resistivity beyond the casing 105. The more frequencies that are abstracted, the more accurate the calculated resistivity will be. It should be noted that the signal sent by the source in the new tool is not limited to time domain signals, as it can also use frequency domain signals. The source system 100 in the new cross casing resistivity tool can be replaced by the source system 109, or any kind of electric dipole source.

Figure 5A:
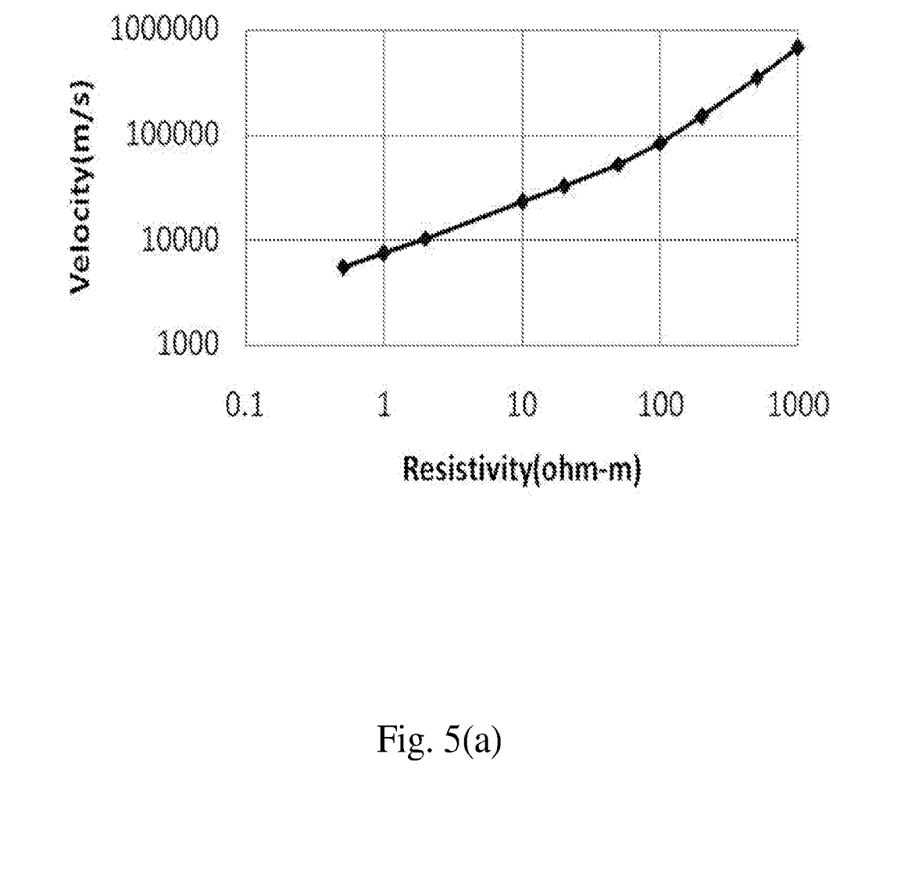
FIG. 5(a) shows an example of the relationship between the velocity of current and formation resistivity.

FIG. 5 (a) shows an example of the relationship between current velocity and formation resistivity. Here, the source frequency is fixed at 10 Hz. If the current velocity on a casing 105 is measured, the formation resistivity can be found by the relationship shown in FIG. 5(a). One of ordinary skill in the art would recognize that not only the time difference, but also the phase difference can be used to calculate the velocity of signal propagation, and subsequently determine the formation resistivity beyond the casing 105. Thus, the time difference and phase difference can be used to determine formation resistivity behind casing 105.

Figure 5B:
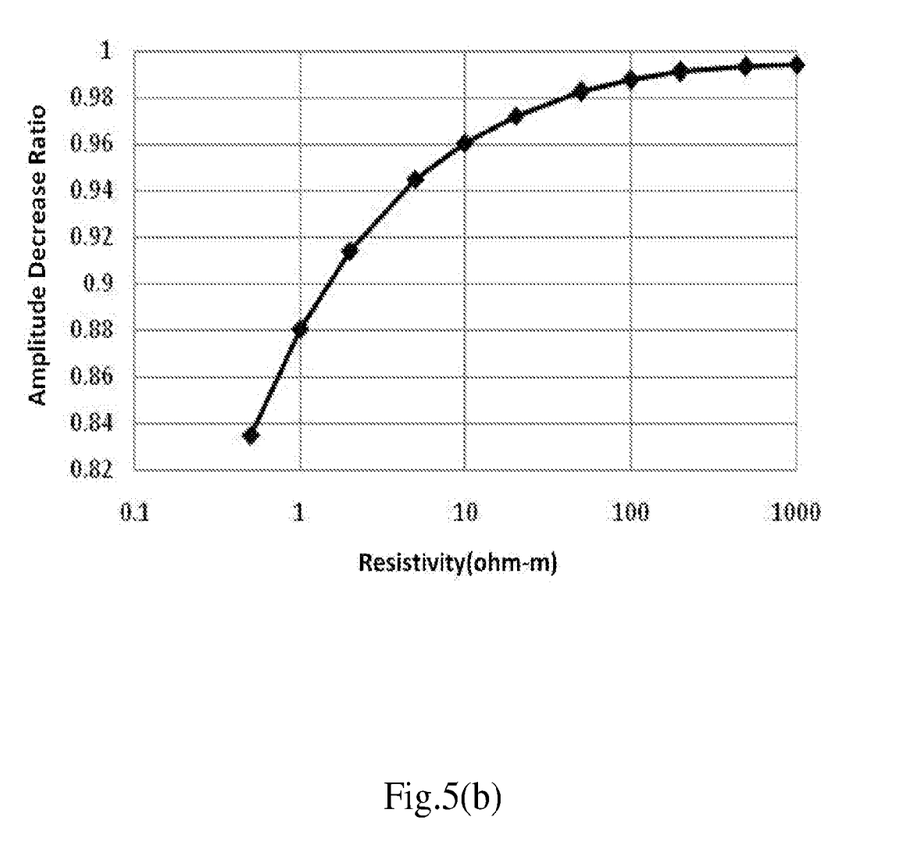
FIG. 5(b) shows an example of the relationship between decrease of current amplitude and formation resistivity.

FIG. 5(b) shows an example of the relationship between current decrease ratio and formation resistivity. The current decrease ratio is defined as measurement of receiver 402 divided by measurement of receiver 401 (see FIG. 4). Here, the source frequency is fixed at 10 Hz. If the current decrease ratio on a casing 105 is measured, the formation resistivity can be found by the relationship shown in FIG. 5(b). In another embodiment, decrease in current amplitude can also be used to determine formation resistivity. For example, once the decrease in current amplitude is computed, one can use the relationship shown in FIG. 5(b) to compute the formation resistivity beyond casing 105.

Figure 6:
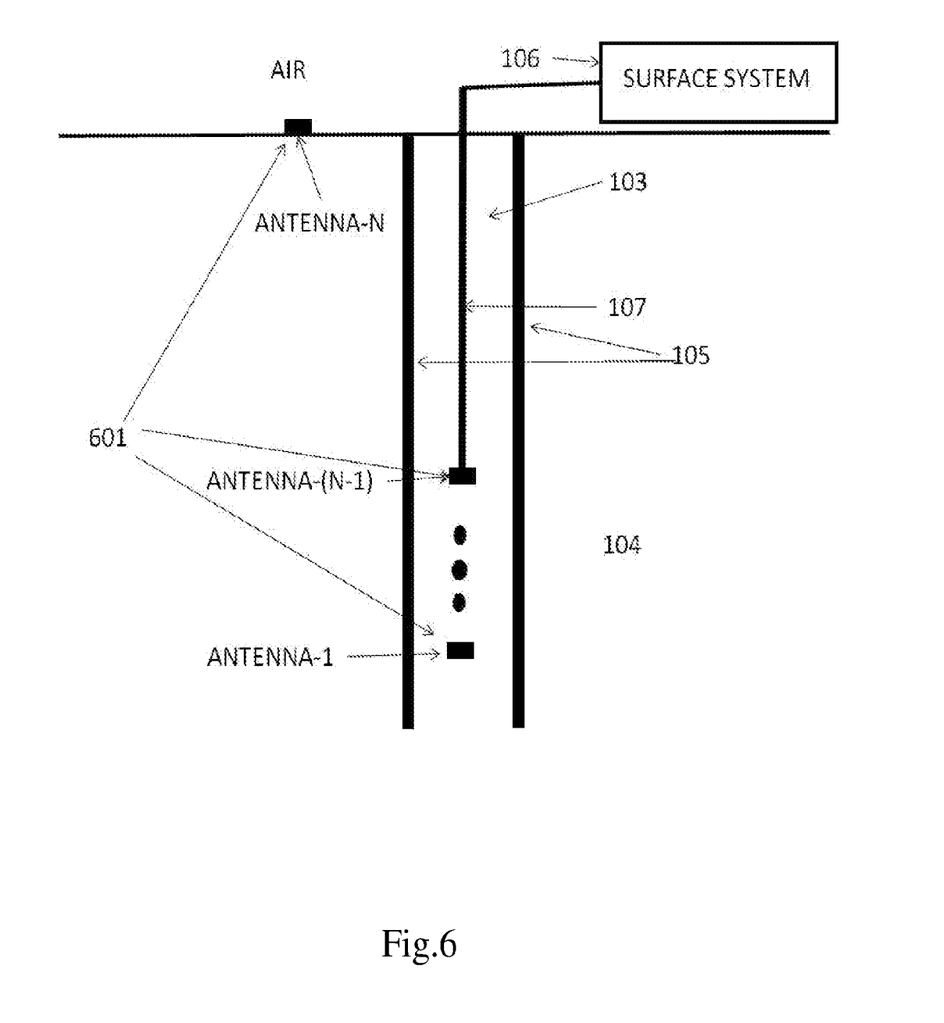
FIG. 6 shows a general tool structure of cross casing resistivity.

FIG. 6 shows a general cross casing resistivity tool structure. In one embodiment, the structure includes N number of antennas 601, in which at least one antenna is used for output of electric signals, at least one antenna is used for flow back of the signal, and at least one antenna is used as measuring receiver to detect signal propagation on the casing. The signal traveling velocity, traveling time, phase difference and amplitude decrease between the signal source and a receiver, or between two receivers, can be computed from the measured signal, and are used to compute the formation resistivity beyond the casing 105. The source system employed in FIG. 6 can be replaced by the source system 109, or any kind of electric dipole.

In one embodiment, the present invention provides a cross casing resistivity system, which uses the traveling speed of an electric signal to calculate the resistivity beyond a casing.

In one embodiment, the present invention provides a cross casing resistivity system that applies at least one of two principles to determine the formation resistivity beyond a casing: the higher the formation resistivity beyond the casing is, the faster the traveling speed of an electric signal on the casing; and the higher the frequency an electric signal is, the faster the traveling speed of the electric signal will be.

In one embodiment, the present invention uses either current or voltage as an electric signal, the traveling speed of which is used to calculate the formation resistivity beyond a casing.

In one embodiment, the present invention comprises one antenna acting as output part of an AC signal source, one antenna acting as input part of the AC signal source, and one receiver that measures the electric signal. The electric signal can be current, voltage, or both. The traveling speed of the signal is calculated from either the travel time of the signal from the AC signal source to the receiver or the phase shift in the signal from the AC signal source to the receiver.

In another embodiment, the present invention comprises one antenna acting as output part of an AC signal source, one antenna acting as input part of the AC signal source, and two receivers that measure the electric signal, which can be current, voltage, or both.

In one embodiment, the signal source of the present invention comprises a toroid coil mounted outside of a metal. In one embodiment, the toroid coil comprises a closed ferrite ring, and a conductive wire is winded on the ring. When current is applied to the toroid coil, it will generate voltage difference between both sides of the toroid coil. The toroid coil can be regarded as an electric dipole.

In one embodiment, the present invention comprises one signal source, which may or may not be attached to a toroid coil mounted outside of a metal, to act as an AC signal source, and two receivers for measuring the electric signal, which can be current, voltage, or both. The traveling speed of the signal is calculated from either the travel time of the signal between the two receivers or the phase shift in the signal between the two receivers.

In another embodiment, the cross casing resistivity tool of the present invention comprises one or more signal sources, and one or more receivers. For example, the tool may comprise two signal source electrodes, current flows out from one of them and flows back into the other, and three receivers, r1, r2 and r3, are used to measure the electric signals. One can compute current traveling time and speed between r1-r2, r1-r3 and r2-r3. One can use these three times and speeds to compute formation resistivity.

In one embodiment, the present invention includes the aforementioned system, and uses either the travel time of a signal from a signal source to one or more receivers; or the phase shift in the signal from the signal source to the receivers to calculate the traveling speed of the signal.

In another embodiment, the present invention uses any of the aforementioned embodiments and applies a relationship between formation resistivity and signal traveling speed on a casing to determine formation resistivity.

In another embodiment, the present invention uses the phase shift and the traveling speed of a signal to determine formation resistivity.

In another embodiment, the present invention uses the travelling time and the traveling speed of a signal to determine formation resistivity.

In one embodiment, the present invention provides a tool for measuring cross casing resistivity, comprising one or more antennas that emit an electric signal, and one or more antennas into which the electric signal flows back, wherein resistivity beyond a casing is determined based on a relationship between formation resistivity and electric signal traveling speed on the casing. The electric signal traveling speed includes, but is not limited to, signal traveling time, signal phase shift and signal traveling speed. In one embodiment, the electric signal is electric current or voltage.

In one embodiment, the present invention provides a device for measuring cross casing resistivity, comprising one or more signal sources or transmitters that emit an electric signal, and one or more receivers that receive the electric signal, wherein resistivity beyond a casing is determined based on a relationship between formation resistivity and electric signal traveling speed. In one embodiment, the signal traveling speed is based on travel between the receivers. In another embodiment, the signal traveling speed is based on travel between a transmitter and a receiver. In one embodiment, the electric signal traveling speed comprises one or more of signal traveling time, signal phase shift and signal traveling speed. In one embodiment, the electric signal is electric current or voltage.

In one embodiment, the device of the present invention comprises one transmitter and one receiver. In this embodiment, electric signal traveling speed is based on electric signaling from the transmitter to the receiver.

In another embodiment, the device of the present invention comprises one transmitter and two receivers. In this embodiment, electric signal traveling speed is based on electric signaling from one receiver to another receiver.

In another embodiment, the transmitter further comprises a toroid coil mounted over a metal ring. For example, the metal ring is a ferrite ring. In one embodiment, a device may comprise a transmitter with a toroid coil and two receivers.

The present invention provides a device for measuring cross casing resistivity, comprising at least one signal source that emits an AC current, and at least one measuring electrode that measures signals of said AC current, wherein said signals are used to calculate parameters related to propagation of said current on a casing, wherein resistivity beyond said casing is computed based on calculations comprising time difference or current flowing speed for current flowing from said signal source to said measuring electrode. In one embodiment, the signal source comprises an electric dipole. In one embodiment, the measured signals of said AC current comprise electric current or electric voltage. In another embodiment, the measured signals of said AC current comprise time domain signals or frequency domain signals.

In one embodiment, the parameters of current propagation on a casing comprise one or more of current flowing speed, current flowing time between points, current phase shift between points, and current attenuation between points. In one embodiment, the resistivity beyond said casing is computed based on current flowing time, current phase shift or current attenuation.

In one embodiment, the device of the present invention comprises one signal source and one measuring electrode. In one embodiment, the electrode measures time domain signals which are used to compute time difference and current flowing speed for current flowing from the signal source to the measuring electrode, wherein said time difference and said current flowing speed are used to compute formation resistivity behind the casing. In another embodiment, the electrode measures frequency domain signals which are used to compute phase difference and current attenuation for current flowing from the signal source to the measuring electrode, wherein the phase difference and current attenuation are used to compute formation resistivity behind the casing.

In another embodiment, the device of the present invention comprises two measuring electrodes. In one embodiment, the electrodes measure time domain signals which are used to compute time difference and current flowing speed for current flowing through the measuring electrodes, wherein the time difference and current flowing speed are used to compute formation resistivity behind the casing. In another embodiment, the electrodes measure frequency domain signals which are used to compute phase difference and current attenuation for current flowing through the measuring electrodes, wherein the phase difference and current attenuation are used to compute formation resistivity behind the casing.

In one embodiment, the device of the present invention includes a signal source comprising a toroid coil mounted over a ferrite ring.

In one embodiment, current flowing speed has relationship with formation resistivity behind a casing. In another embodiment, current flowing time between points has relationship with formation resistivity behind a casing. In another embodiment, current phase shift between points has relationship with formation resistivity behind a casing. In another embodiment, current attenuation between points has relationship with formation resistivity behind a casing.

What is claimed is:

1. A device for measuring cross casing resistivity, comprising at least one signal source that emits an AC current, at least one measuring electrode that measures signals of said AC current, and at least one computer configured for calculating 1) time difference between measuring electrodes while the AC current flowing along the casing, or 2) phase difference or phase shift between measuring electrodes while the AC current flowing along the casing, or 3) current flowing speed along the casing, or 4) current attenuation between measuring electrodes while the AC current flowing along the casing, based on said signals, and for calculating resistivity beyond said casing based on said calculating of the time difference, or the phase difference, or the current attenuation, or the current flowing speed for current flowing from said signal source to said measuring electrode.

2. The device of claim 1, wherein the signal source comprises an electric dipole.

3. The device of claim 1, wherein the measured signals of said AC current comprise electric current or electric voltage.

4. The device of claim 1, wherein the measured signals of said AC current comprise time domain signals or frequency domain signals.

5. The device of claim 1, wherein said the at least one computer is configured for calculating one or more of current phase shift between points and current attenuation between points based on said signals.

6. The device of claim 1, wherein the at least one computer is confirmed for calculating said resistivity beyond said casing based on current phase shift or current attenuation.

7. The device of claim 1, wherein the device comprises one signal source and one measuring electrode.

8. The device of claim 7, wherein said electrode measures time domain signals which are used to compute time difference and current flowing speed for current flowing from said signal source to said measuring electrode, wherein said time difference, said phase shift, said current attenuation, and said current flowing speed are used to compute formation resistivity behind said casing.

9. The device of claim 7, wherein said electrode measures frequency domain signals which are used to compute phase difference and current attenuation for current flowing from said signal source to said measuring electrode, wherein said phase difference, time difference, current speed, and current attenuation are used to compute formation resistivity behind said casing.

10. The device of claim 1, wherein the device comprises two measuring electrodes.

11. The device of claim 10, wherein said electrodes measure time domain signals which are used to compute time difference, phase difference, current attenuation, and current flowing speed for current flowing through said measuring electrodes, wherein said time difference, said phase difference, said current attenuation, and said current flowing speed are used to compute formation resistivity behind said casing.

12. The device of claim 10, wherein said electrodes measure frequency domain signals which are used to compute phase difference, time difference, current speed, and current attenuation for current flowing through said measuring electrodes, wherein said phase difference and current attenuation are used to compute formation resistivity behind said casing.

13. The device of claim 1, wherein the signal source comprises a toroid coil mounted over a ferrite ring.

14. The device of claim 1, wherein said current flowing speed has relationship with formation resistivity behind a casing.

15. The device of claim 1, wherein said current flowing time between points has relationship with formation resistivity behind a casing.

16. The device of claim 5, wherein said current phase shift between points has relationship with formation resistivity behind a casing.

17. The device of claim 5, wherein said current attenuation between points has relationship with formation resistivity behind a casing.

18. The device of claim 1, wherein said AC current has a frequency of no less than 100 Hz.

19. The device of claim 1, wherein said AC current has a frequency of 100-1000 Hz.

* * * * *